Sept. 1, 1959   W. KAISER   2,902,650
METHOD AND CIRCUIT FOR METERING THE ANGLE OF
PHASE DISPLACEMENT BETWEEN TWO ELECTRIC
OSCILLATIONS HAVING THE SAME FREQUENCY
Filed June 15, 1954   2 Sheets-Sheet 1

Inventor:
WOLFGANG KAISER
BY

Inventor:
WOLFGANG KAISER
BY:

United States Patent Office 2,902,650
Patented Sept. 1, 1959

2,902,650

METHOD AND CIRCUIT FOR METERING THE ANGLE OF PHASE DISPLACEMENT BETWEEN TWO ELECTRIC OSCILLATIONS HAVING THE SAME FREQUENCY

Wolfgang Kaiser, Stuttgart-Vaihingen, Germany

Application June 15, 1954, Serial No. 436,948

Claims priority, application Germany June 15, 1953

9 Claims. (Cl. 324—89)

The present invention refers to a method and circuit for metering the angle of phase displacement between two electric oscillations having the same frequency, and more particularly to a method and circuit of this type in which the current or voltage at the output of the phase metering arrangement serves for determining the phase angle.

In methods of this type it is known to change the two oscillations into a sequence of periodic pulses having the same frequency as the oscillations in order to meter the phase displacement of the oscillations.

According to the known art the oscillations are changed into rectangular pulses whose resultant area varies as a phase displacement occurs, so that the mean value is a measure of the phase displacement and can be indicated in a meter. If, however, only very small phase angles are to be metered, the mean value, that is the resultant pulse area varies to such a small extent that a considerable direct current amplification, or direct voltage amplification, respectively, must be applied to obtain a sufficiently great indication on the meter, which is disadvantageous.

Further arrangements are known, in which the difference between the amplitude of the two compared electric oscillations is determined so that the resultant amplitude is a measure of the phase displacement. To obtain exact measuring results, it is necessary in arrangements of this type that the amplitudes of the two oscillations are exactly equal, and this condition must be the more exactly maintained, the smaller phase angles are to be determined.

It is one object of the present invention to overcome the disadvantages of the known methods for metering the angle of phase displacement between two electric oscillations of the same frequency, and provide a method and circuit for exactly determining the angle of phase displacement.

It is another object of the present invention to provide a method and a circuit for metering the angle of phase displacement between two electric oscillations having the same frequency in which exact results are obtained regardless of the extent of phase displacement.

With these objects in view the present invention mainly consists in a method for metering the angle of phase displacement between two electric oscillations having the same frequency, and comprises, in combination, the steps of changing the two oscillations into sequences of periodic pulses in which at a zero phase difference a predetermined metering harmonic is absent, and in which the predetermined metering harmonic is present when a phase difference occurs between the two oscillations; filtering out the harmonic; and metering the harmonic which constitutes a measure for the phase difference between the two oscillations.

The present invention also consists in a circuit which comprises in combination the following elements: a push pull arrangement including two multiple grid tubes; and means for supplying one of the two oscillations co-phasal to one pair of grids, and the other of the two oscillations in phase opposition to another pair of grids.

In order to overcome the disadvantages of the known methods and circuits for metering the angle of phase displacement, according to the present invention the oscillations are changed into pulses if necessary after phase shifting one of the oscillations for 90°. The pulses are such that at zero phase difference, a predetermined harmonic is absent, which is hereinafter termed metering harmonic. Whenever there is a phase difference, the metering harmonic is present, and is filtered out, amplified, if required, and measured, since the metering harmonic constitutes a measure for the angle of phase displacement.

Any shape of the pulses can be chosen, provided that one, or a plurality of hamonics is absent when the angle of phase displacement is zero. Only one of the harmonics, however, is used as metering harmonic. It is preferable to select a pulse shape by which it is assured that a variation of the pulses effects a proportional variation of the metering harmonic which is proportional to the phase difference at least within a desired range.

The method according to the present invention is particularly advantageous for the metering of angles of small phase displacement, and is far more exact than the known methods. In the event that in the method according to the present invention the height or amplitude of the pulses varies due to variations in the input amplitudes, or of the applied voltage, for $p$ percent, the amplitude of the harmonics is also varied for only $p$ percent. In contrast thereto, any variation of the amplitude difference in the known amplitude difference method or of the pulse height in the known pulse area difference method, respectively, diminishes the accuracy of measurement for small angles of phase displacement to a proportionally far higher extent, and results in a minimum limit for measured phase angles below which the phase angle cannot be accurately determined.

Moreover, the method according to the present invention has the advantage that an alternating voltage amplification can be applied which is not possible for metering the angle of phase displacement according to the known methods in which the mean value is determined and in which a considerable direct current amplification, or direct voltage amplification, respectively, is required.

In many cases it is advantageous to change the oscillations into rectangular pulses whose length or duration is varied by the phase difference, that is shortened or lengthened. Any length of a pulse can be chosen, but particularly as far as rectangular pulses are concerned, a pulse time of $$\frac{T}{n}$$

is advantageous, T being the duration of the period, and $n$ being an integer and the index of the metering harmonic.

Variations of the input amplitude may influence the measured value due to the fact that the rise time required for the rising of the pulses cannot be made infinitely small so that wave rise and drops are present which have a finite slope, and moreover whose slope may vary. The influence of the pulse rise and drops on the measured value can be limited considerably by selecting a suitable sequence of positive and negative pulses, which at zero phase difference have the same shape and size. The variation of the positive and negative pulses under the influence of an occurring phase difference can be of any desired type, preferably however, the variation is opposite for the two sets of pulses so that for instance one set of pulses are shortened and the other set of pulses are lengthened.

The circuits used for carrying out the method of the present invention must be of a type permitting to produce from the two electric oscillations whose angle of phase displacement is to be determined, pulses of the desired shape and length. Moreover, the arrangement must be such that the length of the pulses varies as a function of the angle of phase displacement.

For instance a push pull arrangement including two multiple electrode tubes may be used, wherein the voltages of the two oscillations are co-phasal on one pair of grids, and in phase opposition on the other pair of grids. Preferably tubes having anode current limiting characteristics are used.

Instead of the above described circuit, a means may be provided to distort the input voltages into rectangular pulses which are then converted into the desired pulse sequence by controlled rectifiers.

It is also possible to produce the desired pulses by converting the zero passages of the two input voltages by differentiation into narrow pulses, which are then fed to a flip flop circuit, on whose output the desired pulse sequence is obtained.

It is advantageous to provide a 90° phase shifter for adjusting the zero point of the phase angle metering arrangement. Preferably, the phase shifter is adjustable within a small range of few degrees.

In the event that the pulses have rectangular shape, the change of the metering harmonic is at small angles of phase displacement proportional to the sine of the angle of phase displacement, and therefore an exact measuring of the phase displacement angle in a small range, for instance ±20°, is possible with a proportional measuring device. It is advantageous to use a phase shifter permitting a phase shifting from zero to $2\pi$ since this makes possible the use of the measuring instrument also for greater angles of phase displacement.

In the event that the phase displacement angle is to be measured within a greater frequency range, either the amplifier which amplifies the metering harmonic is made tunable, or the two input voltages are reduced to the constant metering frequency by superheterodyning.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
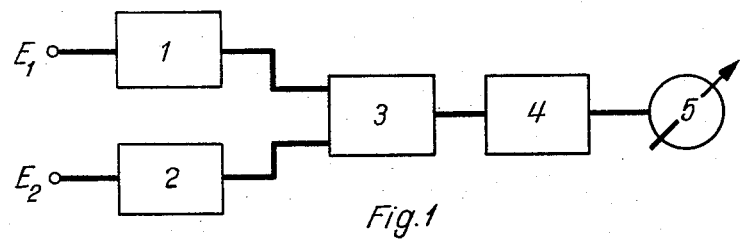
Fig. 1 is a diagram showing an arrangement according to the present invention.

Referring now to the drawings and more particularly to Fig. 1, the amplifiers 1 and 2 amplify two electric oscillations E1 and E2 which have the same frequency, and whose angle of phase displacement is to be determined. The desired pulse sequence is obtained from said two sine-shaped oscillations in the element 3, which preferably contains a phase shifter by which one of the two oscillations is given a phase displacement. From the pulse sequence produced in the element 3, in the harmonic amplifier 4 a harmonic is filtered out and amplified, which serves as metering harmonic and is supplied to a measuring instrument 5 indicating the angle of phase displacement.

Figure 2:
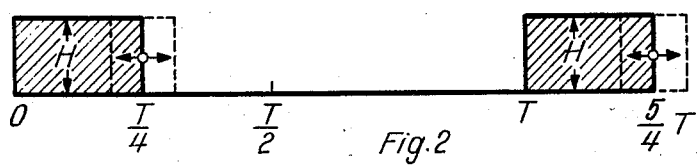
Fig. 2 illustrates a sequence of positive rectangular pulses.

In Fig. 2 is illustrated a rectangular pulse sequence which at a phase difference of zero has a duration of pulse of $$\frac{T}{4}$$

In this arrangement one of the two oscillations has been shifted through 90° in phase. The pulses whose area is shaded have a height or amplitude H, and are without the fourth harmonic which is used for the metering of the angle of phase displacement.

If the angle of phase displacement changes, the duration of the pulse is shortened or lengthened in accordance with the arrows in Fig. 2. The shape of the pulse shown in broken lines corresponds to a predetermined angle of phase displacement.

Figure 3:
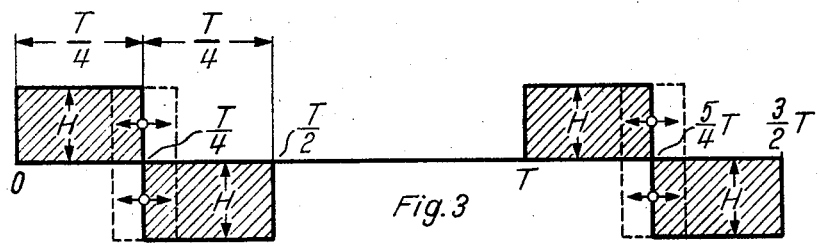
Fig. 3 illustrates a sequence of positive and negative rectangular pulses.

Fig. 3 illustrates a sequence of positive and negative pulses which have the same height or amplitude H, and at zero phase displacement have the same length as the pulses shown in Fig. 2. As can be seen from Fig. 3, at a zero phase displacement, the two associated pulses are so arranged that they are directly connected to each other with reference to the zero line. When the angle of phase displacement varies, the positive pulse is shortened, and at the same time the negative pulse is lengthened, or vice versa. The direction of pulse change is indicated by the arrows.

Figure 4:
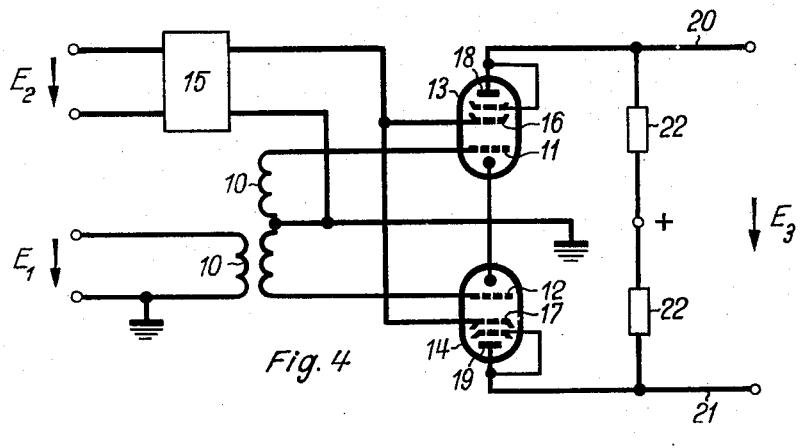
Fig. 4 is a diagram showing a circuit according to the present invention including two pentodes.

Fig. 4 illustrates a first embodiment of the circuit for producing rectangular pulses. To produce pulses of the desired shape, it is necessary in this circuit that the alternating input voltages E1 and E2 are not sine-shaped, but rectangular. The voltage E1 is supplied through a push pull transformer 10 to the grids 11 and 12 of the tubes 13 and 14, while the voltage E2 is directly supplied to the grids 16 and 17 through a 90° phase shifter 15. The output of the pulses is then between the conductors 20 and 21 which lead to the anodes 18 and 19 of the two tubes, the pulse voltage being indicated in the drawing by the reference character E3.

Figure 5:
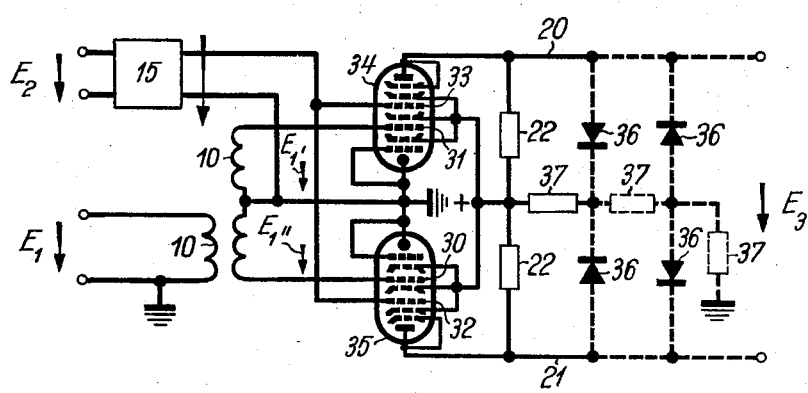
Fig. 5 is a diagram showing a circuit according to the present invention including two tubes having nine electrodes.

In Fig. 5 a further embodiment is illustrated in which the input voltages E1 and E2 may have sine-shape. The circuit according to Fig. 5 corresponds substantially to the circuit shown in Fig. 4, the difference being that the voltages are supplied to the grids 30 and 31, and 32 and 33, respectively, of tubes 34 and 35 which have nine electrodes. The tubes 34 and 35 are tubes which have a determined anode current limiting characteristic so that a constant anode current flows when at the grids 31, 33 and 30, 32, respectively, positive voltages are applied. The other grids of the tubes are not designated with reference numerals and serve for keeping the tubes in proper operating condition.

The circuit according to Fig. 5 can also be provided with other tubes than nine electrode tubes, as long as these tubes have a clearly determined current limiting characteristic.

Figure 6:
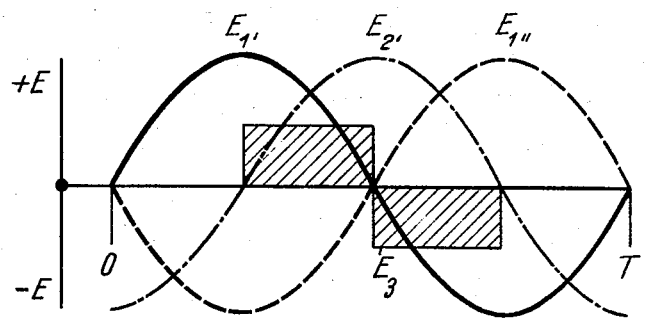
Fig. 6 illustrates the sequence of pulses produced by a circuit according to Fig. 5.

The voltages E1', E2', and E1'' of Fig. 5 are illustrated in Fig. 6 together with the pulses created by these voltages.

An output limiter is shown in Fig. 5 in broken lines, and includes diodes 36 and resistors 37 by which a strip of a desired height can be cut out of the pulses produced in accordance with Fig. 6.

By means of the thus changed pulses it is possible to increase the accuracy of measuring because the ratio between the time of the pulse rise and the duration of the entire pulse is improved in the event that the rise of the pulse is not exactly perpendicular to the zero line.

It will be understood that each of the elements described above, or two or more together, may also find a useful application in other types of measuring arrangements and methods for metering the angle of phase displacement of two oscillations differeing from the types described above.

While the invention has been illustrated and described as embodied in a method and circuit for metering the angle of phase displacement between two electric oscillations having the same frequency, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A circuit for determining any difference in phase between two electric oscillations having the same frequency, comprising, in combination, a push pull arrangement including two multiple grid tubes; means operatively connected with said push-pull arrangement for supplying one of the two oscillations co-phasal to one pair of grids of said tubes, respectively, and the other of said two oscillations in phase opposition to another pair of grids of said tubes, respectively; phase shifter means operatively connected with said push-pull arrangement for shifting one of said two oscillations through 90°; means operatively connected to said two multiple grid tubes for receiving a sequence of pulses based on a combination of said oscillations and for filtering out a predetermined metering harmonic appearing in the output of said tubes; and means operatively connected with said means for filtering, for metering said harmonic which constitutes a measure for the phase difference between the two oscillations.

2. A circuit as claimed in claim 1 wherein said phase shifter means is a wide band phase shifter for shifting the phase within a predetermined range of frequency; including amplifier means operatively connecting said filtering means with said metering means, for amplifying said filtered harmonic; and means connected with said amplifier means for adjusting the frequency of said amplifier for said harmonic whereby the circuit can be used for a predetermined range of frequency.

3. A circuit for determining any difference in phase between two electric oscillations having the same frequency, comprising, in combination, first means for changing said two oscillations into sequences of periodic pulses so that at a zero phase difference a predetermined metering harmonic is absent, and that said predetermined metering harmonic is present when a phase difference occurs between said two oscillations; second means connected with said first means for receiving the combined sequence of said periodic pulses including said predetermined metering harmonic if present and for filtering out said harmonic; and metering means connected to said second means for receiving said filtered-out harmonic and for metering the same for obtaining a measure for any phase difference existing between said two oscillations.

4. A circuit as set forth in claim 3 including means connected with said first means for shifting one of said oscillations through a phase angle of 90°.

5. A circuit as set forth in claim 4 including amplifier means connected between said second means and said metering means, for amplifying said metering harmonic before metering.

6. A circuit as set forth in claim 3 wherein said first means are adapted to change the said oscillations into rectangular pulses.

7. A circuit as set forth in claim 6 wherein said means for changing said oscillations into rectangular pulses are adapted to furnish pulses having a duration of $$\frac{T}{n}$$

wherein T is the duration of one period and $n$ is an integer and the index of said harmonic.

8. A circuit as set forth in claim 3 wherein said first means are adapted to change said oscillations into a sequence of positive and negative pulses having the same number of periods, said pulses having at zero phase difference the same shape and length.

9. A circuit as set forth in claim 8 wherein said means for changing said oscillations into a sequence of pulses is adapted to produce a sequence of positive and negative pulses following each other directly at zero phase difference in such a manner that the length of said pulses is varied at the point of connection of the same by an occurring phase difference with the result that one of said pulses is lengthened and the other one of said pulses is shortened.

References Cited in the file of this patent

UNITED STATES PATENTS

| | | |
|---|---|---|
| 2,416,517 | Farrow | Feb. 25, 1947 |
| 2,580,803 | Logan | Jan. 1, 1952 |
| 2,595,675 | Jaynes | May 6, 1952 |
| 2,751,555 | Kirkpatrick | June 19, 1956 |
| 2,805,398 | Albersheim | Sept. 3, 1957 |

OTHER REFERENCES

Measuring Phase at Audio and Ultrasonic Frequencies, a reprint from Electronics, October 1949, by Kretzmer.

Electronics, February 1954, pages 188–192, article on "Phase Selective Detectors" by Schafer.